United States Patent
Bourdon et al.

(10) Patent No.: US 8,386,777 B2
(45) Date of Patent: Feb. 26, 2013

(54) METHOD AND EQUIPMENT FOR CONTROLLING ACCESS TO MULTICAST IP FLOWS

(75) Inventors: Gilles Bourdon, Longjumeau (FR); Christian Jacquenet, Pont-Pean (FR)

(73) Assignee: France Telecom, Paris (FR)

( * ) Notice: Subject to any disclaimer, the term of this patent is extended or adjusted under 35 U.S.C. 154(b) by 1321 days.

(21) Appl. No.: 11/884,244

(22) PCT Filed: Feb. 15, 2006

(86) PCT No.: PCT/FR2006/000352
§ 371 (c)(1), (2), (4) Date: Feb. 15, 2006

(87) PCT Pub. No.: WO2006/087472
PCT Pub. Date: Aug. 24, 2007

(65) Prior Publication Data
US 2008/0289008 A1 Nov. 20, 2008

(30) Foreign Application Priority Data
Feb. 18, 2005 (FR) .................................. 05 01704

(51) Int. Cl.
*H04L 29/06* (2006.01)
*G06F 7/04* (2006.01)
*G06F 9/00* (2006.01)

(52) U.S. Cl. ............ 713/163; 713/153; 713/154; 726/4; 726/11; 726/21

(58) Field of Classification Search ................. 726/4, 11, 726/21; 713/153, 154, 163
See application file for complete search history.

(56) References Cited

U.S. PATENT DOCUMENTS

| | | | |
|---|---|---|---|
| 6,275,859 B1 | 8/2001 | Wesley et al. | |
| 7,680,884 B2 * | 3/2010 | Zhou et al. | 709/205 |
| 2002/0091926 A1 * | 7/2002 | Fukutomi | 713/170 |
| 2003/0147392 A1 * | 8/2003 | Hayashi et al. | 370/390 |
| 2005/0091313 A1 * | 4/2005 | Zhou et al. | 709/204 |

FOREIGN PATENT DOCUMENTS

| | | |
|---|---|---|
| EP | 1 480 405 A1 | 11/2004 |
| EP | 1 492 381 A1 | 12/2004 |

OTHER PUBLICATIONS

Ishikawa et al., "IGMP Extension for Authentication of IP Multicast Senders and Receivers," IETF Standard-Working-Draft, Internet Engineering Task Force, IETF, CH, 1, pp. 1-20 (Aug. 5, 1998).

* cited by examiner

*Primary Examiner* — Mohammad W Reza
(74) *Attorney, Agent, or Firm* — Drinker Biddle & Reath LLP

(57) ABSTRACT

The invention relates to a method of controlling access to multicast IP flows. Following connection to a collection equipment by a user terminal, the method consists in: transmitting an access authorization request message from said collection equipment to an access control server; and, subsequently, upon successful verification of the user access right, transmitting an access authorization acceptance message comprising at least one multicast filter from the server to the collection equipment or, in the absence of a successful verification, transmitting an access refusal message from the server to the collection equipment in order to inhibit the connection of the user terminal. The invention is suitable for multicast broadcasting over an IP, Internet and/or corporate network.

12 Claims, 4 Drawing Sheets

| IDMF | $T_y = \binom{0}{1}$ | IP(S) | IP(G) | $FV = [0,1]$ |

METHOD AND EQUIPMENT FOR CONTROLLING ACCESS TO MULTICAST IP FLOWS

CROSS-REFERENCE TO RELATED APPLICATIONS

This application is the U.S. national phase of the International Patent Application No. PCT/FR2006/000352 filed Feb. 15, 2006, which claims the benefit of French Application No. 05 01704 filed Feb. 18, 2005, the entire content of which is incorporated herein by reference.

BACKGROUND OF THE INVENTION

The invention relates to the field of telecommunications, in particular the control of access to Multicast IP streams.

In the Multicast IP broadcasting technique, the Multicast IP packets are broadcast using a particular recipient IP address, termed the Multicast address.

A Multicast stream is characterized by its source address S and by its group address G, each Multicast stream being able therefore to be represented by a unique pair (S, G). Two distinct Multicast streams can thus have the same source address S or the same group address G.

The particular feature of Multicast IP streams pertains essentially to the fact that the data supporting these streams are transmitted to the requesting terminal equipment, for example an audio-visual decoder, on the latter's request transmitted over the IP network.

The request to receive, or to stop receiving a Multicast stream is made according to the IGMP protocol, standing for Internet Group Management Protocol, defined at the IETF by recommendations RFC 1112, RFC 2236 and RFC 3376 or according to the MLD protocol, standing for Multicast Listener Discovery, defined by recommendations RFC 2710, RFC 3810.

On receipt of a reception request message, a message of the "Membership report" type, specifying the desired broadcasting source address, the first item of telecommunication equipment of the IP network capable of interpreting this request message transmits the corresponding Multicast data stream to the place from which this request message originates.

A Multicast stream broadcasting request message can also pertain to a set of sources for a given group G, the Multicast stream then being designated (*, G) and then corresponding to a sum of the streams sent by the various sources to this same group.

In the context of Multicast stream broadcasting and of the present application, the expression collection equipment denotes the network equipment handling a user's IGMP/MLD request message, so as to dispatch the corresponding Multicast data stream to said user.

At the present time, the Multicast broadcasting request message transmission protocols, of IGMP type, do not define any procedure for authenticating or authorizing a requesting user to ask for the transmission of a networked Multicast stream.

With this aim attempts have been proposed at the IETF suggesting that the aforesaid request messages be modified with the aim of trunking authentication information to an authentication/authorization platform. Successful authentication and authorization allows consideration of the requesting user's request message by the collection equipment.

The aforesaid proposal, ultimately shelved, poses the following problems:

major impact on the existing Multicast stream management protocols, because of the addition of authentication layers on the network access equipment and on the terminal equipment of the user;

need for access to an authorization platform with each Multicast stream request message transmitted by a user, a process which may appreciably increase the Multicast stream reception time in the case of Multicast broadcasting of TV programs on high-speed line of ADSL type for example.

Another authorization approach has furthermore been proposed. According to the latter, with the aim of determining the right of a user to request the broadcasting of a determined Multicast stream, the terminal of the requesting user seeks this authorization from a specific authorization platform connected to the IP network. On receipt of the authorization request, the authorization platform returns an acceptance or a rejection of the authorization, according to the user's rights to receive the requested Multicast stream. On receipt of the accepted authorization, the user's terminal then sends the network a Multicast broadcasting request message, of the IGMP request type, so as to receive the corresponding Multicast stream.

The latter solution exhibits the following drawbacks:

need for access to an authorization platform with each message requesting broadcasting of the Multicast streams, and this may, as in the case of the previous proposal, appreciably increase the Multicast stream reception time in the case of Multicast broadcasting of a TV program on high-speed line of ADSL type;

security problem in the case where the user's terminal is modified so as to dispatch a Multicast broadcasting request message of IGMP type to the IP network without prior request of the rights to the authorization platform.

SUMMARY OF THE INVENTION

The object of the present invention is to remedy all the drawbacks of the proposals of the prior art, by implementing a local method and system for controlling access to Multicast IP streams.

In particular, this aim is achieved by developing at the level of any collection equipment a specific local function for accepting or denying Multicast IP broadcasting request messages.

Another object of the present invention is, furthermore, the implementation of a method and equipment for controlling access to Multicast IP streams by virtue of which the IGMP or MLD Multicast IP broadcasting request message transmission protocols are unchanged, thereby making it possible to guarantee total compatibility of the method and system which are the subject of the invention with the existing user terminal hardware.

Another object of the present invention is, furthermore, the implementation of a local method and system for controlling access to Multicast IP streams in which the volume of the protocol exchanges with an authorizing entity, charged with accepting or denying the requested access authorization, is significantly reduced.

The method of controlling access to a Multicast IP stream requested by the user terminal from Multicast IP stream broadcasting request message collection equipment connected to the IP network, which is the subject of the present invention, is noteworthy in that, following the connection of this user terminal to this collection equipment, the latter consists at least in transmitting from this collection equipment to an access control server, connected to the IP network, an access authorization request message. Following successful authentication and/or identification and verification of the access rights of the user terminal by this access control server, it consists in transmitting from this access control server to this collection equipment an access authorization acceptance message comprising at least one Multicast filter. Otherwise, following a failure of successful authentication and/or identification and verification of the access rights of this user terminal by the access control server, it consists in transmitting from this access control server to this collection equipment an access authorization denial message so as to inhibit the connection of the user terminal.

The method of controlling access to a Multicast IP stream which is the subject of the present invention finds application to the control and management of the broadcasting of Multicast streams over IP networks, local company networks and/or the Internet network, and to the distribution of applications and/or services such as multimedia applications of the TV line over ADSL type conveyed by the aforesaid Multicast IP streams.

DETAILED DESCRIPTION OF THE INVENTION

A more detailed description of the method of controlling access to a Multicast IP stream requested, by a user terminal, from collection equipment connected to the IP network will now be given in conjunction with FIG. 1 and the following figures.

Figure 1:
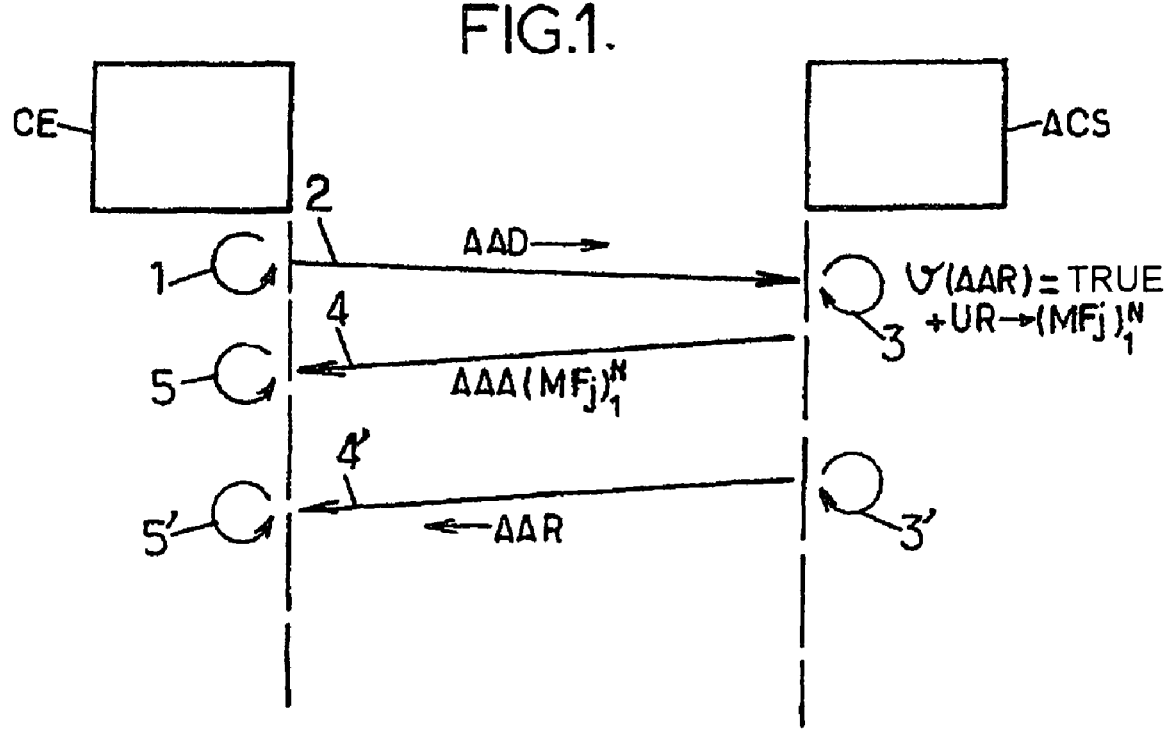
FIG. 1 represents, purely by way of illustration, a spatio-temporal chart of the essential steps for implementing the method which is the subject of the present invention.

In a general manner, consideration is given to a user terminal UT not represented in the drawing of FIG. 1, connected to an IP network. The aforesaid user terminal can transmit to the collection equipment CE a connection request and Multicast IP stream broadcasting message in a totally conventional manner.

The Multicast IP stream broadcasting request message corresponds for example to a request message transmitted in accordance with the IGMP protocol or the MLD protocol as mentioned previously in the description.

With reference to FIG. 1, the method which is the subject of the present invention consists at least in transmitting from the collection equipment CE to an access control server ACS, connected to the IP network, an access authorization request message denoted AAD in the aforesaid figure.

Denoted 1 in the same figure is a step of preparing the data access authorization request message AAD and 2 the operation proper of transmitting the aforesaid message AAD to the access control server ACS.

The aforesaid step 2 is then followed by a step 3 executed at the level of the access control server ACS consisting of an authentication and/or an identification of the user terminal and of a verification of the access rights of the user terminal UT. This step denoted 3 is executed by the access control server ACS and represented by the symbolic relation

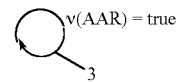

It is indicated that the criteria and the processes for implementing authentication and verification of access rights can be conventional criteria and processes which, for this reason, will not be described in detail.

On successful authentication and/or identification and verification of the access rights in step 3, the method then consists in transmitting in a step 4 from the access control server ACS to the collection equipment CE, an access authorization acceptance message AAA. The aforesaid message comprises at least one Multicast filter.

The aforesaid step 4 is then followed by a step 5 executed at the level of the collection equipment CE which consists in allowing the connection of the user terminal UT to the collection equipment CE, as well as in installing in the latter the Multicast filter or filters transported during step 4.

Conversely, following a failure of successful authentication and/or identification of the user terminal and verification of the access rights of the user terminal UT, this step being represented by step 3' of FIG. 1 at the authentication server ACS level and symbolized by the relation

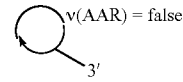

the method which is the subject of the invention continues with a step 4' consisting in transmitting, from the access control server ACS to the collection equipment CE, an access authorization denial message AAR. The message transmitted in the aforesaid step 4' then makes it possible to inhibit in a step 5' executed at the collection equipment CE level the connection of the user terminal to the latter.

However, and according to a non-limiting preferential mode of implementation of the method which is the subject of the present invention, the access authorization acceptance message AAA advantageously comprises at least one set of Multicast filters, which are of course intended to conduct the access control proper following the receipt of the message AAA after step 4 of transmitting the latter by the collection equipment CE.

In particular, according to a noteworthy aspect of the method which is the subject of the present invention, each Multicast filter comprises at least one value of filter type per authorization or denial of transmission of a Multicast IP broadcasting request message, this Multicast broadcasting request being defined for example by the address pair S, G of the source S of the Multicast broadcast and of the group G considered.

As represented in the aforesaid FIG. 1, to execute step 4 of transmitting the access acceptance authorization message AAA accompanied by the whole set of filters denoted $(MF_j)_1^N$, j designating a filter reference MF for example, in step 3 of FIG. 1 the user rights are recovered on the Multicast stream so as to translate in terms of a set of Multicast IP filters the whole set of the aforesaid rights.

With this aim, in addition to a field comprising a value of filter type per authorization or denial of transmission of a Multicast IP broadcasting request message, each filter can advantageously comprise at least the address IP(S) of the Multicast IP stream broadcasting source, the address IP(G) of the recipient Multicast group of the Multicast broadcast, a functional update value by adding, or deleting an existing Multicast IP filter, the role of which will be described subsequently in the description, and a Multicast IP filter identification number, this filter identification number being tied to the index j previously mentioned.

Consequently, in FIG. 1, the access authorization acceptance message is represented by the relation $$AAA(MF_j)_1^N.$$

The method which is the subject of the present invention such as described in conjunction with FIG. 1 can advantageously be implemented by virtue of the family of protocols for transmitting messages of type AAA standing for Authentication, Authorization, Accounting, the access control server ACS being, under this assumption, a server of the same AAA server type implementing more particularly the protocol termed RADIUS protocol.

The method which is the subject of the present invention can also be implemented by virtue of the DIAMETER protocol and, under this assumption, the exchanging of messages between the collection equipment CE and the access control server ACS is performed according to this protocol, the aforesaid access control server itself being a server of AAA server type implementing more particularly the DIAMETER protocol.

The method which is the subject of the present invention such as described in conjunction with FIG. 1 can be implemented in particular during a request for connection of a user terminal UT or in any case for any request for connection of a user terminal to collection equipment.

The method which is the subject of the present invention also makes it possible to implement various particular variants which in fact make it possible to execute operations, such as the changing of access authorization, while the rights for example of the user are still valid but these rights require a change with a view to an access promotion modification or the like for example, respectively upon a renewal of the rights of a determined user, it then being considered that the aforesaid rights are still valid but that they absolutely must be renewable. A change or a renewal of access authorization is executed by an operation carried out under the authority of the access control server ACS alone.

A variant implementation of the method which is the subject of the present invention in an application to a change of access authorization will now be given in conjunction with FIG. 2a. It is appreciated in particular that in this situation the renewal is also implemented under the authority of the access control server ACS alone under the conditions hereinafter.

Figure 2A:
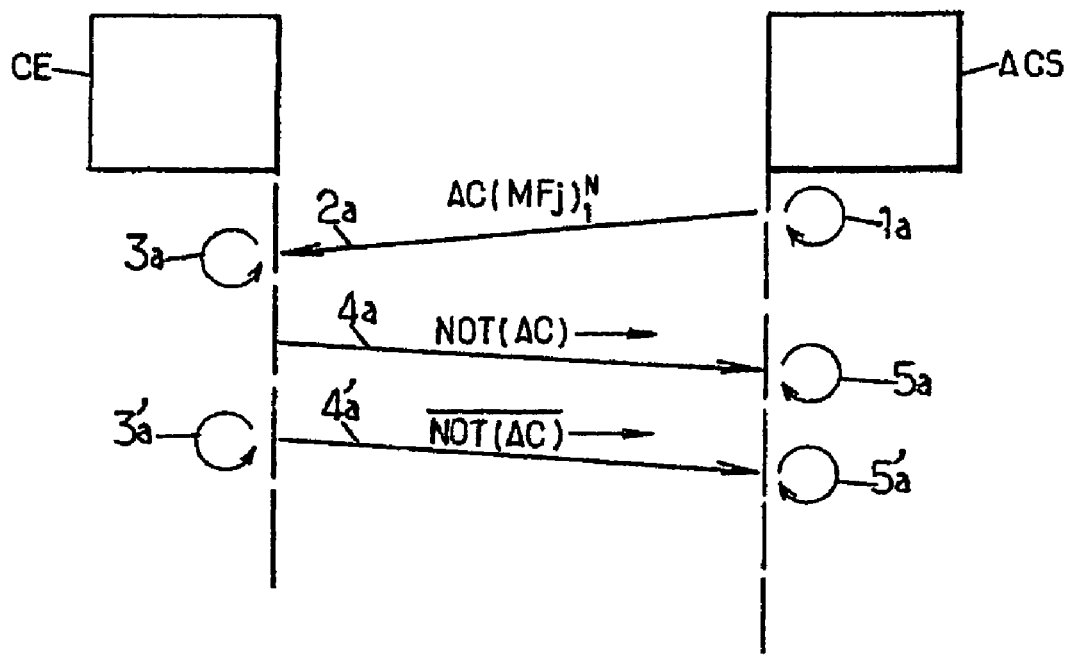
FIG. 2a represents, purely by way of illustration, a variant implementation of the method which is the subject of the invention during an access authorization change phase proposed for a specific user terminal.

Following the transmission of the authorization acceptance message, such as previously described in FIG. 1, the user terminal considered being connected, the method which is the subject of the invention in the variant according to FIG. 2a consists for example, under the control of the access control server ACS in transmitting from the aforesaid access control server to the collection equipment CE an access authorization change message denoted AC.

Preferably, as represented in FIG. 2a, the aforesaid access authorization change message comprises the transmission of Multicast filters making it possible to execute this change at the collection equipment CE.

In FIG. 2a, the aforesaid step of transmitting the authorization change message is denoted 2a.

It is followed by a step 3a, executed at the level of the collection equipment CE, which consists in verifying the proposed change of authorization and in accepting and executing the aforesaid change of access under the authority of the collection equipment CE.

Step 3a is then followed by a step 4a consisting in transmitting from the collection equipment CE to the access control server ACS a message notifying acceptance and execution of the change of access authorization by the collection equipment, this message being denoted:

$$NOT(AC).$$

Otherwise, on rejection and absence of execution of the change of access authorization at the level of the collection equipment CE, this rejection step being denoted 3a' in FIG. 2a, the method of changing access authorization which is the subject of the invention, such as represented in FIG. 2a, consists in transmitting from the collection equipment CE to the access control server ACS a message of denial and non-execution of the change of access authorization by the collection equipment. In FIG. 2a, the message of denial and non-execution of the change of access authorization is denoted $$\overline{NOT(AC)}.$$

The aforesaid step 4a' can then be followed at the level of the access control server ACS by a step 5a' which consists in looping the access authorization process.

It is understood, in particular, that within the framework of the change of access authorization illustrated in FIG. 2a, the access authorization change message makes it possible to transport one or more Multicast IP filters whose functional value is a functional value for updating by adding or deleting an existing Multicast IP filter.

A more detailed description of a variant implementation of the method which is the subject of the invention in the case of a renewal of an access authorization for a determined user will now be given in conjunction with FIG. 2b.

Figure 2B:
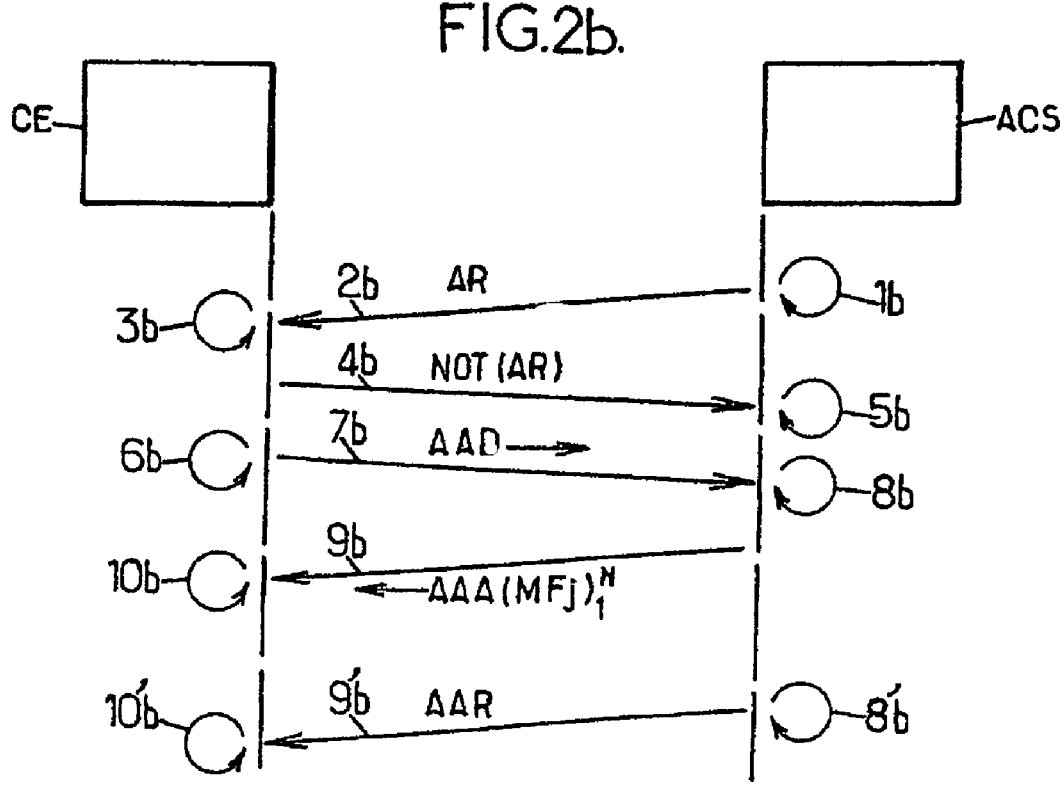
FIG. 2b represents, purely by way of illustration, a variant implementation of the method which is the subject of the invention during an access authorization renewal phase proposed for a specific user terminal.

The method which is the subject of the invention such as described in conjunction with FIG. 2b, in the case of a renewal of an access authorization, or in any case of the transmission of a new access authorization, can be implemented so long as the relevant user terminal UT is connected to the IP network, on the initiative of the access control server ACS.

With reference to FIG. 2b and under the control of the access control server ACS, the method which is the subject of the invention then consists of a step 1b consisting, in respect of the access control server ACS, in taking a decision of new access authorization for the relevant user UT and in establishing new user rights on the Multicast stream, these new rights then being able to be translated into Multicast filter terms, as described previously in the description.

The aforesaid step 1b is then followed by a step 2b consisting in transmitting, from the access control server to the collection equipment CE, an access authorization renewal message, which is denoted AR in the aforesaid FIG. 2b.

Step 2b is then followed by a step 3b executed by the collection equipment CE which for example consists in consideration of the renewal request transmitted by the access control server ACS.

Step 3b is then followed by a step 4b consisting in transmitting, from the collection equipment CE to the access control server ACS, a message notifying consideration of the renewal request by the aforesaid collection equipment.

Step 4b is then followed by a step 5b executed at the level of the access control server ACS this step consisting in archiving the consideration of the access authorization renewal request for the user UT.

The collection equipment CE undertakes a step 6b, step analogous to step 1 of FIG. 1, for example, then a transmission, in step 7b, of an access authorization request by a message AAD, which is considered in step 8b by the access control server ACS.

The latter having stored and archived the consideration notification transmitted in step 4b of reauthorizing access and archiving this request in step 5b, undertakes, in a step 8b, a verification of the access rights for the user terminal UT and the dispatching of new rights or of a renewed access authorization by dispatching in step 9b an access authorization acceptance message, also comprising a plurality of Multicast filters $MF_j$ corresponding of course to the new Multicast rights within the framework of the renewal of authorization.

Step 9b is then followed by a step 10b executed at the level of the collection equipment CE, this step being of course similar to step 5 of FIG. 1 for example.

In the case where, as represented in FIG. 2b, the verification of the rights by the access control server ACS cannot be performed in step 8b', the latter step is then followed by a step 9b' of transmitting a access authorization denial message AAR comparable with step 4' of FIG. 1.

Step 9b' is followed by a step 10b' executed by the collection equipment CE considering the rejection of the access authorization in a manner similar to step 5' of FIG. 1, without however inhibiting the connection of the user terminal UT to the collection equipment CE.

Finally, in a general manner, it is indicated that any access authorization or reauthorization request transmitted from the collection equipment CE to the access control server ACS is followed by a step of verifying the access rights of the requesting user terminal, executed by the aforesaid access control server ACS.

A more detailed description of the Multicast IP filters and of their expression in the aforesaid access authorization acceptance messages AAA will now be given in conjunction with FIG. 3a and FIG. 3b.

Figures 3A, 3B:
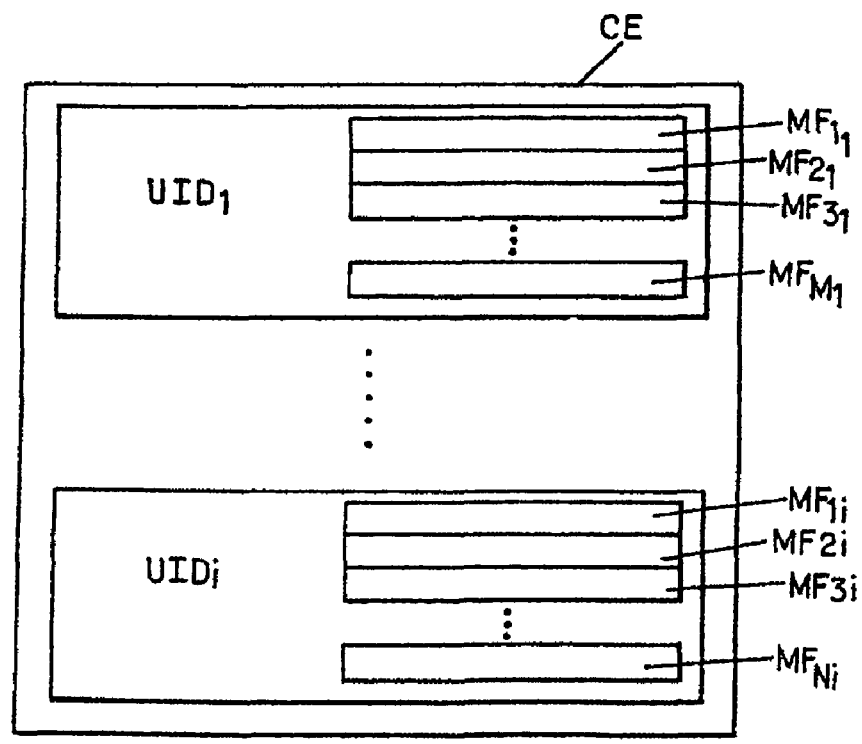
FIG. 3a represents, purely by way of illustration, the structure of a Multicast filter allowing the implementation of the method which is the subject of the present invention.
FIG. 3b represents, purely by way of illustration, a specific architecture for storing Multicast filters allowing the implementation of the method which is the subject of the present invention.

In FIG. 3a is represented in fact the structure of a Multicast IP filter allowing the implementation of the method which is the subject of the present invention. Such a filter, in particular when the latter is incorporated into an access authorization acceptance message, advantageously comprises, as represented in FIG. 3a, a value of filter type per authorization or denial of transmission of a Multicast IP broadcasting request message, defined by a pair of addresses. In FIG. 3a, the type value is designated Ty and is presumed to take two arbitrary values 0 or 1 upon authorization respectively denial of transmission of a Multicast IP broadcasting request message.

The Multicast IP filter also comprises, as represented in the aforesaid figure, the address IP(S) of the Multicast IP stream broadcasting source, the address IP(G) of the Multicast group intended to receive the relevant Multicast broadcast from the source of address S and a functional value denoted FV for updating by adding, or deleting an existing Multicast IP filter. In FIG. 3a, the functional value FV is presumed to be able to take 2 distinct arbitrary values 0, 1 each value corresponding to the function for adding or deleting an existing Multicast IP filter. As regards the value 0, representing for example the addition function, the latter can correspond to a replacement, in an installed given Multicast filter, of the address values of the source S and/or the group G, as well as type values Ty.

Finally, each Multicast filter comprises a Multicast IP filter identification number denoted as header for example, IDMF.

The whole set of aforesaid messages thus makes it possible to convey a plurality of Multicast filters, which, of course, represent the whole set of Multicast access rights of each relevant user terminal UT.

In particular, the aforesaid message exchanges can be executed by means of the family of AAA protocols, such as the RADIUS and DIAMETER protocols previously mentioned in the description according to table 1 hereinafter.

TABLE 1

Application to the RADIUS and DIAMETER protocols

| Message AAA | RADIUS Equivalent (RFC 2865 + RFC 3576) | DIAMETER Equivalent (RFC 3588 + NASREQ) |
|---|---|---|
| Access Authorization Request | Access-Request | AA-Request |
| Authorization Request | Access-Request with Service-Type = "Authorize-Only" | AA-Request with attribute Auth-Request-Type = "Authorize-Only" |
| Authorization accepted | Access-Accept | AA-Answer + Result-Code Success (2xxx) |
| Deny Authorization | Access-Reject | AA-Answer + Result-Code Failure (3xxx or 4xxx) |
| Change of Authorization | CoA-Request | No equivalence |
| Change OK | CoA-ACK | Re-Auth-Answer + Success Code (2xxx) |
| Change NOK | CoA-NAK | Re-Auth-Answer + Failure Code (3xxx or 4xxx) |
| Request for reauthorization in respect of the user | CoA-Request with attribute Service-Type = "Authorize-Only" | Re-Auth-Request with attribute Auth-Request-Type = "Authorize-Only" |
| Notification of consideration (reauthorization request) | CoA-NAK with attribute Error-Cause = "Request Initiated", Service-Type = "Authorize-Only" | Re-Auth-Answer + Success Code (2xxx) + Auth-Request-Type = "Authorize-Only" |
| Authorization accepted + dispatch multicast filters | Access-Accept with attribute transporting the filter or filters (VSA attribute or one to be standardized) | AA-Answer + Result-Code Success (2xxx) with attribute transporting the filter or filters (VSA attribute or one to be standardized) |
| Change of authorization + dispatch multicast filters | CoA-Request with attribute transporting the filter or filters (VSA attribute or one to be standardized) | No equivalence |

With reference to the aforesaid table, the transport of the Multicast filters is thus performed by means of a dedicated attribute to be assigned by the entities ensuring the access control and in particular by the access control server ACS.

This attribute can be executed by an attribute of VSA type, standing for Vendor Specific Attribute.

In the aforesaid table:
- the first column designates the messages AAA that is to say the messages transmitted and previously described with FIGS. 1, 2a, 2b,
- the second column designates a mode for implementing the aforesaid messages within the framework of the RADIUS protocol according to recommendation RFC 2865 and RFC 3576 of the IETF for Internet Engineering Task Force;
- the third column designates a mode for implementing the aforesaid messages according to the DIAMETER RFC 3588+NASREQ protocol. NASREQ is a proposal currently referenced draft-ietf-aaa-diameter-nasreq-17.txt, a proposal whose purpose is to evolve like RFC.

In the aforesaid columns of the table, the wording in italics of the second and third columns refers to the official designation according to the corresponding recommendations for the RADIUS respectively DIAMETER protocols.

It will be noted in particular that, the change of authorization as described in conjunction with FIG. 2a, for example, is implemented exclusively by virtue of the RADIUS protocol since the DIAMETER protocol does not allow, at present, the use of specific messages for this type of operation.

The number of Multicast filters dispatched per message depends on the maximum size of the message authorized by the protocol considered. It also depends on the maximum size authorized by the protocol for the transport of an attribute. It is possible to dispatch the same attribute several times in the same message. The system for numbering the Multicast filters, that is to say the allocation of the IDMF identification number also makes it possible to put the aforesaid filters in place by repeating the previously described exchanges several times.

The format of the Multicast filters dispatched can be optimized for example by performing groupings of the type:
- grouping of the filters whose filter type is the same, authorization respectively denial, according to the operation to be carried out add or delete;
- grouping of the addition or deletion operations;
- grouping of the sources having to be filtered for a group of given users;
- grouping of the groups having to be filtered for a given source.

On receipt of the access authorization acceptance message, the message AAA of FIGS. 1, 2b, and of the message AC of FIG. 2a in particular of the aforesaid message comprising the Multicast filters for the user terminal considered UT, the collection equipment CE then undertakes the following operations:
- determination of the context specific to the management of the relevant user connection for the installation of the filters, such an operation as represented in FIG. 3b can consist in discriminating a user identifier denoted $UID_1$ to $UID_i$ in FIG. 3 and the corresponding context information;
- extraction proper of the filters received by the protocol of AAA protocol type, this extraction consisting in reading the various fields of each filter such as represented in FIG. 3a,
- evaluation of the content of the Multicast filter which is a candidate for installation.

In this operation, the filters received for a deletion operation then allow the deletion of the existing filters on the basis, for example, of the filter number, that is to say of the corresponding IDMF number, the filters being, for example, stored with their user context and their IDMF filter identifier designated $MF_{J1}$ to $MF_{M1}$ respectively $MF_{1i}$ to $MF_{Ni}$ in FIG. 3b. The filters can also be deleted on the basis of the triple S, G, type, that is to say the variable Ty. In the case where an inconsistency exists between the triple S, G, Ty and the filter number, then no filter that may correspond is deleted. In the absence of inconsistency, of course, the Multicast filter which is a candidate for deletion is then deleted.

The filters received for an addition operation are installed in the place indicated for example by the filter number, or according to a one-to-one relation, at a memory address of the collection equipment CE.

When for example, the filter number is not indicated, the collection equipment CE can then install the filter subsequent to the list of the filters that are specific to the user context in the order of evaluation of the filters received and by assigning an internal number that is greater than the existing number for the context.

If, conversely, the specified filter number refers to a different filter already in place, the new filter is installed in place of the latter.

With reference to FIG. 3b, it is indicated that each filter $MF_{J1}$ to $MF_{M1}$ or $MF_{1i}$ to $MF_{Ni}$ is stored while preserving the following fields:
- the serial number of the filter in the list of the Multicast filters present in the user context, that is to say the IDMF identification number;
- the address IP(S) source IP address of the relevant Multicast filter or the designation of all the possible source addresses ("*" or else representable as the IP address 0.0.0.0);
- the IP address of the relevant Multicast group G or the designation of all the possible group addresses ("*" or else representable as the IP address 0.0.0.0);
- the filter type, that is to say authorization or denial by the variable Ty making it possible to determine the interpretation which must be made of the filter during the evaluation of a request.

Thus, the information stored by the collection equipment CE is equivalent to that transported by the access authorization acceptance messages AAA, although the storage format may appear different from the transport format.

Only the information relating to the addition or deletion operation carried out by the collection equipment CE can be deleted, the successive filters being stored and kept in memory at the collection equipment CE level as represented in FIG. 3b.

As regards the evaluation of a Multicast IP stream broadcasting request message by the collection equipment CE, an IGMP or MLD request, this evaluation can be performed in the following manner:
- determination of the origin of the request making it possible to retrieve the context of the relevant user and chopping of the request into application for individual streams: if the application requesting reception of the streams S1, S2, S3, G1, that is to say of the streams broadcast by the sources S1, S2, S3 for the group G1, the requests obtained by distributing the sources over the group, that is to say the requests S1G1, S2G1, S3G1 are evaluated separately;
- before considering the serial numbers of the filters, the requests are evaluated first in the light of the following filter:

a) global prohibition of a source whatever the groups, i.e. (S,*);
b) global prohibition of a group whatever the sources, i.e. (*, G).
   the request is evaluated in the light of each filter in the order given by the filter numbers until the description of the Multicast stream of the request corresponds to the relevant filter;
   the first action, permission or denial, terminates the evaluation of the request in the list of filters;
   in the event of non-correspondence of the request with the filter of the user context, the request is denied by default. In particular, it is possible to consider however that the absence of any filter for a user signifies the absence of any desire for filtering in which case any request is accepted;
   to accept by default a request at the end of the evaluation necessitates the presence of a permission type filter with S and/or G valued at 0.0.0.0 and whose serial number places the filter at the end of the evaluation list;
   if the request is accepted, then the Multicast stream requisition is continued in a manner which is transparent to the control and authorization process. If the request is denied, no action is engaged for a Multicast stream requisition corresponding to the denied request.

A more detailed description of a server for controlling access to Multicast streams in accordance with the subject of the present invention will now be given in conjunction with FIG. 4a.

Figure 4A:
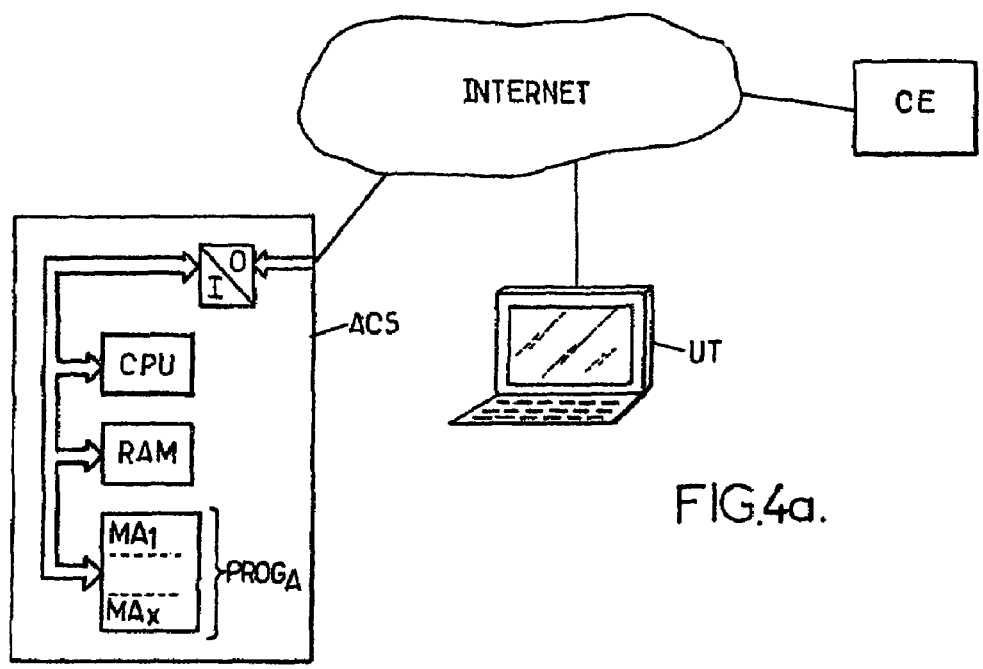
FIG. 4a represents, by way of illustration, an access control server, in accordance with the subject of the present invention.

With reference to the aforesaid figure, it is indicated that, in addition to a central processing unit CPU, a RAM work memory unit and an I/O input-output unit allowing the connection of the access control server ACS to the Internet network as represented in FIG. 4a, the latter comprises at least one module generating access authorization messages, the messages AAA of FIGS. 1 and 2b and AC of FIG. 2a, this generating module being denoted $MA_1$ in FIG. 4a. In particular the generating module can consist of a program module $MA_1$, which is stored in the access control server ACS and in the latter's program memory area $PROG_A$. It is of course understood that the acceptance messages comprise at least one Multicast filter such as described in conjunction with FIG. 3a and comprise, in particular, at least one value of filter type per authorization or denial of transmission of a Multicast IP broadcasting request message defined by a pair of addresses. Of course, the access control server ACS which is the subject of the invention also comprises other message generating modules denoted $MA_x$ and corresponding, through the RAM work memory call by the CPU, to the implementation of the method as described in conjunction with FIGS. 1 and 2a, 2b.

Figure 4B:
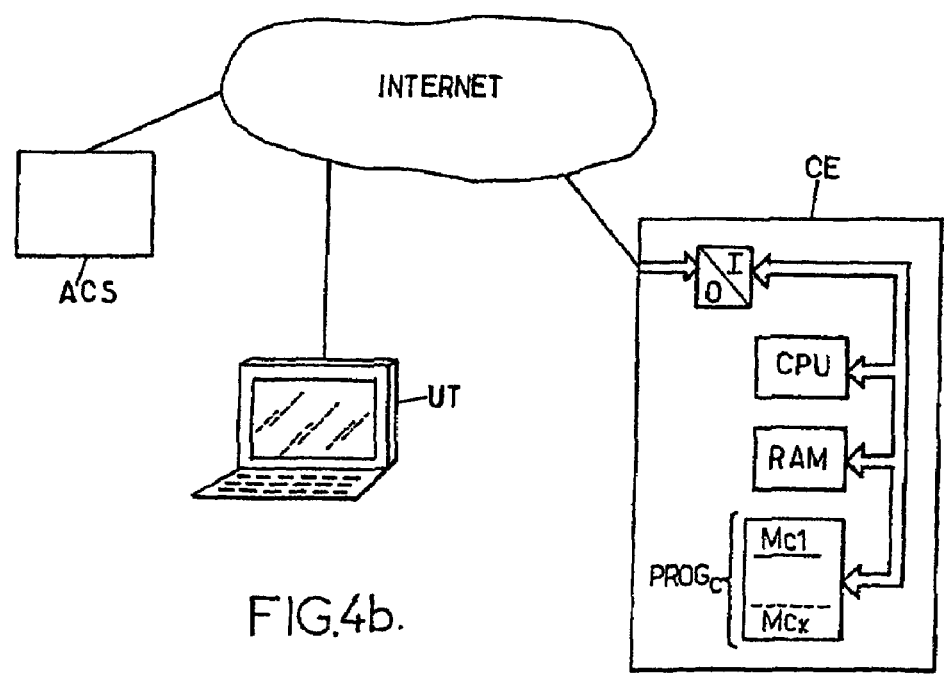
FIG. 4b represents, by way of illustration, collection equipment in accordance with the subject of the present invention.

A more detailed description of collection equipment CE for a Multicast IP broadcasting request message in accordance with the subject of the present invention will also be described in conjunction with FIG. 4b.

With reference to this figure, in addition to a central processing unit CPU, a work memory, RAM and I/O input-output facilities allowing the connection of this collection equipment CE to the Internet network, the latter comprises at least one module for generating an access authorization request message, that is to say the message AAD of FIG. 1, 2a or 2b. This generating module can correspond for example to a program module $MC_1$ stored in a program memory area $PROG_C$ of the collection equipment CE and called by the central unit into the work memory of said equipment for corresponding execution. Likewise, the collection equipment CE comprises a module for storing access authorization acceptance messages, module denoted $MC_2$ in FIG. 4b, that is to say messages AAA as well as Multicast filters contained in the latter. It also comprises a module $MC_3$ for installing the aforesaid Multicast filters as described previously in the description. The modules $MC_2$ and $MC_3$ also correspond to program modules stored in the program memory $PROG_C$ of the collection equipment CE. For execution, these are called by the CPU into the RAM work memory and corresponding execution in accordance with the method described previously in the description in conjunction with FIGS. 1, 2a, 2b. Other functional modules denoted $MC_x$ can be envisaged in the aforesaid program memory area. In particular, a module $MC_4$ is envisaged for executing the analysis of the Multicast IP broadcasting requests in relation to the Multicast filters installed.

As regards the installation module $MC_3$, the latter, for each Multicast filter received, executes the operations consisting in discriminating, on the basis of the Multicast IP broadcasting request message, the references of the requesting user terminal, in extracting each Multicast filter from the Multicast IP broadcasting authorization acceptance message, evaluating the content of the Multicast filter which is a candidate for installation as previously described in the description, and, on evaluation of the deletion functional value, deleting the corresponding existing Multicast filter, then installing the Multicast filter which is a candidate for installation. Otherwise, on evaluation of the functional value for adding or updating the filter which is a candidate for installation, installing the Multicast filter which is a candidate for installation, as described previously in the description.

The invention furthermore covers a computer program recorded on a storage medium comprising a series of instructions for execution by a computer or a dedicated device, such as a server for controlling access to a Multicast IP stream described previously in conjunction with FIG. 4a. It is noteworthy in that, during this execution, this series of instructions allows the implementation of the steps of authenticating and/or identifying and verifying the access rights of a user terminal and of transmitting from this access control server to collection equipment an access acceptance or acceptance denial message of the method of controlling access to a Multicast IP stream requested by this user terminal, described previously in conjunction with FIGS. 1, 2a, 2b, 3a and 3b.

The invention finally covers a computer program recorded on a storage medium comprising a series of instructions for execution by a computer or a dedicated device, such as equipment for collecting a Multicast IP broadcasting request message sent by a user terminal, described previously in conjunction with FIG. 4b. It is noteworthy in that, during this execution, this series of instructions allows the implementation of the step of transmitting, from this collection equipment to an access control server, an access authorization request message of the method of controlling access to a Multicast IP stream requested by this user terminal, described previously in conjunction with FIGS. 1, 2a, 2b, 3a and 3b.

The invention claimed is:

1. A method of controlling access to a Multicast IP stream requested by a user terminal from Multicast IP stream broadcasting request message collection equipment connected to an IP network, wherein following the connection by this user terminal to this collection equipment, the method comprising:
   transmitting from this collection equipment to an access control server, connected to the IP network, an access authorization request message; and,
   following at least one of successful authentication and identification and verification of access rights of said user terminal by said access control server, transmitting from said access control server to said collection equipment an access authorization acceptance message, said access authorization acceptance message comprising at least one set of Multicast filters, installing in the collection equipment the at least one set of Multicast filters and analyzing a Multicast IP broadcasting request message in relation to the at least one installed filter;

following at least one of a failure of successful authentication and identification and verification of the access rights of said user terminal, by said access control server:
   transmitting from said access control server to said collection equipment an access authorization denial message; and
   inhibiting the connection of the user terminal to the collection equipment.

2. The method as claimed in claim 1, wherein each Multicast filter comprises at least one value of filter type per authorization or denial of transmission of a Multicast IP broadcasting request message, defined by at least one group address.

3. The method as claimed in claim 2, wherein in addition to a field comprising a type value, each Multicast filter comprises at least:
   an address IP(S) of the Multicast IP stream broadcasting source;
   an address IP(G) of the Multicast group;
   a functional value for updating by adding or deleting an existing Multicast IP filter; and
   a Multicast IP filter identification number.

4. The method as claimed in claim 1, further comprising, following the transmission of said access authorization acceptance message, under the control of said access control server:
   transmitting from said access control server to said collection equipment an access authorization change message; and, on acceptance and execution of the change of access authorization by said collection equipment,
   transmitting from said collection equipment to said access control server a message notifying acceptance and execution of the change of access authorization by said collection equipment; otherwise, on rejection and absence of execution of the change of access authorization, and
   transmitting from said collection equipment to said access control server a message of denial and non-execution of the change of access authorization by said collection equipment.

5. The method as claimed in claim 4, wherein said access authorization change message comprises at least one Multicast IP filter whose functional value is a functional value for updating by adding or deleting at least one existing Multicast IP filter.

6. The method as claimed in claim 1, further comprising, under the control of said access control server:
   transmitting from said access control server to said collection equipment an access authorization renewal message; and,
   on consideration of the access authorization renewal by said collection equipment, transmitting from said collection equipment to said access control server a message notifying consideration of the access authorization renewal by said collection equipment;
   otherwise, in an absence of consideration of the access authorization renewal by said collection equipment, transmitting from said collection equipment to said access control server a message notifying absence of consideration of the access authorization renewal.

7. The method as claimed in claim 6, wherein said access authorization renewal message comprises at least one Multicast IP filter whose functional value is a functional value for updating by deleting an existing Multicast IP filter.

8. The method as claimed in claim 1, wherein any access authorization or reauthorization request transmitted from said collection equipment to said access control server is followed by a step of verifying the access rights of the requesting user terminal, executed by said access control server.

9. An item of equipment for collecting a Multicast IP broadcasting request message, the item comprising:
   means for generating an access authorization request message to an access control server connected to the IP network; and
   means for storing access authorization acceptance messages delivered by an access control server, for installing at least one set of Multicast filters extracted from said access authorization acceptance messages and for analyzing the Multicast IP broadcasting request message in relation to the at least one installed filter.

10. The item of collection equipment as claimed in claim 9, wherein said means for installing at least one set of Multicast filters execute a process for installing Multicast filters comprising, for each Multicast filter received:
   extracting from the Multicast IP broadcasting authorization acceptance message each Multicast filter,
   evaluating the content of the Multicast filter which is a candidate for installation; and on evaluation of the deletion functional value,
   deleting the corresponding existing Multicast filter then installing the Multicast filter which is a candidate for installation, otherwise, on evaluation of the functional value for adding or updating the filter which is a candidate for installation, and
   installing the Multicast filter which is a candidate for installation.

11. A computer program recorded on a non-transitory storage medium comprising a series of instructions for execution by a computer or a dedicated device, wherein during this execution, said series of instructions allows the implementation of the steps of at least one of authenticating and identifying and verifying access rights of a user terminal and of transmitting, from this access control server to collection equipment, an access acceptance or acceptance denial message of the method of controlling access to a Multicast IP stream requested by this user terminal, according to claim 1.

12. A computer program recorded on a non-transitory storage medium comprising a series of instructions for execution by a computer or a dedicated device, wherein during this execution, said series of instructions allows the implementation of the step of transmitting, from said collection equipment to an access control server, an access authorization request message of the method according to claim 1.

* * * * *